United States Patent Office 3,389,179
Patented June 18, 1968

3,389,179
PREPARATION OF ALKYLAMINES BY THE AMMONOLYSIS OF ALKYL HALIDES
Rodney A. James, Helena, Mont., assignor to Phillips Petroleum Company, a corporation of Delaware
No Drawing. Filed Aug. 2, 1965, Ser. No. 476,733
5 Claims. (Cl. 260—585)

ABSTRACT OF THE DISCLOSURE

An alkylamine is prepared by the ammonolysis of alkyl halide using an ether diluent to produce a hydrohalide salt of the alkylamine and then decomposing the salt.

---

This invention relates to a method of making alkyl amines.

A basic method for the preparation of alkyl amines is the ammonolysis of alkyl halides. This method is conventionally carried out in the presence of an alcohol such as methanol, which alcohol is present as the reaction medium or diluent. The method produces the desired alkyl amine in the form of a hydrohalide salt ($RNH_2 \cdot HX$, where R is an alkyl radical and X is a halide). This salt is then reacted with a base stronger than the alkyl amine, e.g. an alkali such as sodium hydroxide in order to obtain the free alkyl amine. This base reaction step requires the use of a large amount of base and thereby adds expense to this basic method.

It has now been found that if an ether is employed as a reaction medium or diluent the hydrohalide salt formed is a solid which can be readily separated from the reaction mixture and converted into an alkyl amine by heating. Thus, the neutralization step and expense of the conventional method is eliminated by this invention.

Accordingly, it is an object of this invention to provide a new and improved method for preparing alkyl amines.

Other aspects, objects, and the several advantages of this invention will be readily apparent to those skilled in the art from the description and the appended claims.

The alkyl halides which can be used in this invention for preparing the alkyl amines are those in which the halide is attached to a primary or secondary carbon atom of the alkyl chain. These alkyl halides can be represented by the general formula RX, where R is an alkyl radical which has 1 to 20 carbon atoms, preferably 5 to 20 carbon atoms, and X is a halogen such as iodine, chlorine, or bromine. Representative alkyl halides which can be used in this invention include methyl chloride, methyl bromide, methyl iodide, ethyl chloride, 1-chloropropane, 2-iodopropane, 2-bromo-2-methylpropane, 2-chloro-2-methylpropane, 1-chloropentane, 1-bromohexane, 1-iodooctane, 2-bromooctane, 2-bromo-3-methylnonane, 1-iodo-decane, 1-chlorodecane, 5-iododecane, 3-bromo-2,3,4-trimethyloctane, 1-chlorododecane, 2-chlorododecane, 7-(2-methylbutyl)-6-bromopentadecane, 5-bromotetradecane, 6-bromopentadecane, 5-bromotetradecane, 6-chlorohexadecane, 2-chlorooctadecane, 1-bromoeicosane, and the like, including mixtures thereof. An example of a feed containing mixed alkyl halides which can be used in this invention is that which is produced by the chlorination or bromination of a paraffin mixture such as kerosene or paraffins which result from the treatment of kerosene with molecular sieves.

The reaction conditions employed in this invention can vary widely so long as they meet, overall, ammonolysis conditions. Generally, the reaction temperature will be in the range of from about 200 to about 600, preferably from about 300 to about 550° F. The reaction pressures can be autogenous and can be as high as 1000 to 2000 p.s.i.g. and higher, when high mol ratios of ammonia to alkyl halide are employed. Reaction times will vary considerably depending upon reaction temperatures, pressures, reactants, and the like but will generally be from about 0.5 to 10 or more hours. The reaction can be carried out in a batch or continuous manner.

The ethers employed, known by the formula ROR, can be either a simple ether wherein both R groups are alike or the mixed ethers wherein the R groups are different. The R groups in either the simple or mixed ethers can be alkyl radicals containing from 1 to 8, preferably 1 to 6, carbon atoms per molecule, inclusive, or cycloalkyl radicals containing from 3 to 8 carbon atoms per molecule, inclusive, or both. Also, tetrahydrofuran, 1,4-dioxane, and 1,2-dimethoxyethane can be employed as the ether reaction medium. Of course, mixtures of two or more of any of the above-mentioned ethers can be employed.

Representative ethers besides tetrahydrofuran, 1,4-dioxane, and 1,2-dimethoxyethane, include diethyl ether, dibutyl ether, diisopentyl ether, dioctyl ether, dicyclopropyl ether, dicyclohexyl ether, dicyclooctyl ether, ethyl cyclobutyl ether, hexylcyclopropyl ether, isoheptylcyclooctyl ether, and the like.

The amount of ether used is that sufficient to serve as a reaction medium or diluent for the reaction. Generally, the ether used will vary from about 25 to about 95, preferably from about 40 to about 80, weight percent based upon the total amount of ether and ammonia employed. The ether and ammonia can be charged to the reaction zone individually or in combination. If desired, the amount of ether employed can be about one volume of ether per volume of alkyl halide charged to the reactor. The ammonia can be bubbled into the ether and then the ether-ammonia solution charged to the reactor. The ammonia employed can be in a gaseous or liquid phase or both. The reaction is preferably carried out under anhydrous conditions but minor amounts, i.e. no more than 5 weight percent of the reaction mixture, of water can be present. Generally, the mol ratio of ammonia to alkyl halide will be from 2/1 to 50/1, but is preferably from 5/1 to 25/1.

The hydrohalide salt (e.g. $RNH_2HCl$) is formed as a solid phase in the reaction product and is separated therefrom by conventional solid-liquid separation processes such as filtration (vacuum, centrifugation, and the like), distillation, extraction followed by distillation and/or filtration, and the like. The separated solid phase can be washed free of retained contaminants by use of the ethers such as those discussed above or other suitable reaction solvents which are substantially non-deleterious to the hydrohalide salt.

Thereafter the separated and washed hydrohalide salt can be heated substantially to the decomposition temperature of that salt to cause the formation of the free alkyl amine in a liquid phase by the evolution of a hydrogen halide gaseous phase. The heating of the hydrohalide salt can be carried out at widely varying temperatures, generally a temperature in the range of from about 350 to about 750, preferably from about 400 to about 650° F. The time of heating will vary widely and primarily need only be that time required to substantially decompose the hydrohalide salt. Generally, this heating will be for at least 1 hour, preferably from about 1 to about 10 hours. The heating of this salt can be carried out in the atmosphere or in an inert atmosphere such as a vacuum, nitrogen, and the like.

Example

Ammonia, 2-chlorooctane, and diethyl ether are each separately charged to a stirred and heated reactor. The ammonia and 2-chlorooctane are charged in the mol ratio of 5/1, respectively. One volume diethyl ether is added to the reactor for each volume of 2-chlorooctane charged to the reactor.

The contents of the reactor are heated at about 450° F. and at about 1500 p.s.i.g. for about 1½ hours.

After heating, vaporous ammonia is vented from the reactor and a mixture of a liquid phase and a solid phase is removed. The liquid reaction product contains primarily diethyl ether and small amounts of both unconverted 2-chlorooctane and olefins formed by dehydrohalogenation of the 2-chlorooctane during ammonolysis. These minor amounts of 2-chlorooctane and olefins comprise not more than 10 weight percent of the total weight of the liquid phase. The solid phase is a hydrohalide salt characterized by the formula $C_8H_{17}NH_2 \cdot HCl$.

This hydrohalide salt is separated from the liquid phase of the reaction product by vacuum filtration after which the separated salt is washed with fresh diethyl ether to remove entrained and/or retained contaminants.

Thereafter the separated and washed hydrohalide salt is heated at a temperature of about 550° F. until substantial evolution of hydrogen chloride gases ceases. After this heating, there remains a liquid phase which consists essentially of 2-aminooctane.

Reasonable variations and modifications are possible within the scope of this disclosure without departing from the spirit and scope thereof.

I claim:

1. The method for the preparation of alkyl amines by the ammonolysis of alkyl halides having the general formula RX, where R is an alkyl radical with 1 to 20 carbon atoms and X is a halide which is attached to primary or secondary carbon atoms of said alkyl radical and which is one of chlorine, bromine, and iodine, the improvement comprising carrying out said ammonolysis using as a diluent at least one ether selected from the group consisting of alkyl, cycloalkyl, and mixed alkyl and cycloalkyl ethers wherein the alkyl radical contains from 1 to 8 carbon atoms per molecule, inclusive, the cycloalkyl radical contains from 3 to 8 carbon atoms per molecule, inclusive, tetrahydrofuran, 1,4-dioxane and 1,2-dimethoxyethane so that a hydrohalide salt of alkyl amine is formed in a substantially solid phase, separating said solid phase from the reaction product, decomposing said solid phase to produce liquid alkylamine and vaporous hydrogen halide, and recovering said alkylamine.

2. The method according to claim 1 wherein said at least one ether is selected from those alkyl ethers having from 1 to 6 carbon atoms per molecule, inclusive.

3. The method according to claim 1 wherein said decomposition is carried out by heating.

4. The method according to claim 3 wherein said heating is carried out at a temperature in the range 350 to 750° F. for a time sufficient to substantially decompose said substantially solid phase.

5. A method according to claim 1 wherein 2-chlorooctane is reacted with ammonia in diethyl ether, the resulting solid hydrohalide salt of the octyl amine is separated by filtration, and said salt is heated at a temperature and for a time sufficient to substantially decompose same thereby forming a liquid phase consisting essentially of 2-aminooctane and a gaseous phase consisting essentially of hydrogen halide.

References Cited
UNITED STATES PATENTS

| | | | |
|---|---|---|---|
| 2,448,910 | 9/1948 | Reamer | 260—585 X |
| 2,640,080 | 5/1953 | De Tar et al. | 260—585 X |
| 3,299,142 | 1/1967 | Simpson | 260—585 |

CHARLES B. PARKER, *Primary Examiner.*

AL RAYMOND, *Assistant Examiner.*